Patented Mar. 15, 1932

1,849,817

UNITED STATES PATENT OFFICE

LESTER V. ADAMS, OF SCHENECTADY, NEW YORK, ASSIGNOR TO GENERAL ELECTRIC COMPANY, A CORPORATION OF NEW YORK

RESIN COMPOSITION AND METHOD OF PREPARATION

No Drawing. Application filed July 1, 1926. Serial No. 119,988.

The present invention relates to the class of resinous materials, commonly known as condensation products, as for example, the resins made by the chemical combination of polyhydric alcohols and polybasic acids.

These resins appear in a well-defined fusible stage, commonly known as the A-stage and in an infusible stage known as the C-stage. There is a less definite intermediate stage, sometimes known as the B-stage, which may consist of a mixture of the A and C stage resin. The A-stage resins can be readily dissolved cold in various common solvents. For example, the initial condensation product derived from glycerine and phthalic anhydride is readily soluble in acetone at ordinary temperatures. The C-stage or heat-hardened resins heretofore were insoluble in all common solvents. I have discovered that the heat-hardened alkyd resins can be brought into solution under suitable conditions.

As described in Callahan Patents 1,108,329 and 1,108,330 of August 25, 1914, the A-stage resins made from polyhydric alcohols and polybasic acids must be heat-hardened under carefuly controlled temperature conditions to avoid the formation of gas pockets in the resin.

In accordance with my invention, heat-hardened or insoluble-cold condensation products of the alkyd resin class are heated in contact with a liquid or a material liquefiable at the treating temperature until complete solution of the resin occurs. The liquid or liquefiable material used for this purpose should readily dissolve the materials from which the resin is made by chemical condensation.

In the preferred form of my invention, the condensation of the resin is carried out as rapidly as practicable to the C-stage, regardless of the production of cavities in the resin by evolution of gas in the mass. The fully condensed or insoluble-cold resin, from which uncombined or partially combined constituents have been substantially eliminated, then is brought into solution in accordance with my invention either as a solution, for example, as a varnish, or in the solid state, after the solvent has been largely eliminated, for example as a molding resin. My invention also includes as a new composition fully condensed or heat-hardened resin associated with a quantity of solvent which acts as a plasticizer.

Before describing illustrative embodiments of my invention, I wish to point out that the behavior of synthetic resins in their fusible and infusible forms warrants the assumption that the A-stage resin is a "sol" formed of resin associated with uncombined and partially combined ingredients of the resin and the C-stage resin is a "gel" in which the uncombined and partly combined ingredients have been largely or wholly eliminated. Any resin in the gel stage can be reconverted to the sol stage by the action of a substance which will dissolve these uncombined and partially combined constituents. At an elevated temperature the solvent changes the gel to a sol, which is soluble-cold in ordinary volatile solvents. For convenience these solvents are herein termed degelling agents.

My invention may be illustrated by the treatment of insoluble-cold resins of the alkyd resin type with solvents such as glycol diacetate, diethyl phthalate, acetone, acetone oils, benzyl benzoate, benzyl acetate, toluidine, benzyl alcohol, cresol, tricresyl phosphate, triacetin, anisol, o-cresyl benzoate, ethyl lactate, indene, and indene polymer. These solvents are chemically inert with respect to resins, have a negligible vapor pressure at room temperature and boil at temperatures within the range of about 200 to 350° C.

For some purposes, and especially for electrical insulations, a plasticizer, such as indene, which is water-resistant, is of special advantage as it renders the resin water-resistant.

For example, a resin formed from glycerine and phthalic anhydride, a glycerol phthalate or other resin of the same class, which will be referred to generally as alkyd resins, in the completely condensed or C-stage is heated in a closed container at about 170° C. for about 36 hours in contact with one of the above organic liquids. The particular temperature and time of heating may be varied considerably, depending upon the particular degelling agent which is used, the nature of the resin, and other conditions. By this treatment the resin, which was heretofore considered "insoluble" goes completely into solution forming a liquid which may be brought to the desired viscosity by partial or complete evaporation of the solvent. It is desirable, however, to leave some of the solvent in the mixture. In some cases the mixture may be thinned with acetone, or other volatile solvent. In the case of glycerol phthalate which is nearly colorless or faintly yellowish the degellation product has a dark red color due to the presence of pyrogenic decomposition by-products from the resin and resin ingredients.

An alkyd resin in the fusible stage may be heated to a temperature of about 300° C. until the entire mass is converted rapidly into the vesiculate condition which is infusible and also is insoluble in ordinary solvents at room temperature. This vesiculate or pumice-like mass then is ground and treated with a solvent as above described until the resin has gone completely into solution.

The same procedure as above described may be carried out with a low boiling or volatile solvent, such as acetone, but of course in that case the treatment of the resin must be carried out in a closed container or autoclave under pressure to avoid loss of the solvent.

The solution produced by these methods, either with a high boiling point or low boiling point solvent, may be used as a varnish, as an impregnating material, and as a cement for mica or other laminated material. After the removal of the solvent but little baking is required to set the resin. The composition may be also used to produce molded compounds, the solvent in this case being largely removed, the residue preferably being thinned with a volatile solvent, and mixed with various inert fillers in accordance with common practice in the production of molded compounds. The mixture finally is molded and baked for a short time.

The solution of the resin may be readily combined with other organic compounds such as gums, oils, natural or synthetic resins, asphalt, and cellulose substitution products. As the composition is entirely free from uncombined acids, it is of special advantage when used as a coating upon metal or in any other relation in which the effect of an acid is undesirable. It may also be used to advantage with pigments and dyestuffs which under ordinary conditions will be precipitated and cause "livering".

In place of the above-mentioned normally liquid materials, my invention may be carried out with materials which are solid or semi-solid at ordinary temperatures, as for example resins such as cumar, rosin, ester gum, copal; pitches such as wood tar and coal tar pitch; asphalts; shellac; natural gums, such as gum benzoes and white turpentine; and other non-classified organic compounds for example, benzoic anhydride. The insoluble-cold resins may be dissolved in a rubber accelerator such as diphenyl guanidine, and lapit. Degelled oil may be used as a solvent for the C-stage resin, that is a drying oil, such as linseed oil which has been solidified by heating and then reliquefied by continued heating. For many purposes indene or indene polymer is preferred as a solvent.

Preferably the solvent material is not entirely removed from the resin after the practical application or utilization of the resin either as a coating or molding material. The presence of some of the solvent in the C-stage resin, renders the resin more yielding, flexible or plastic. Varnish films for example, containing a small proportion, say a few per cent, of one of the solvents above enumerated, are tougher or more adhesive to metal, and much more flexible than in the absence of such solvent. Molded resins containing a small proportion of one or more of said solvents are more resistant to shock than heat-hardened resins unassociated with solvent and are capable of being machined, that is threaded, turned, drilled, stamped. The ordinary C-stage resin is too brittle to be shaped mechanically in this manner.

What I claim as new and desire to secure by Letters Patent of the United States, is,—

1. The process of dissolving a glycerol phthalate resin in the fully condensed state which consists in heating said resin in an enclosed space with a neutral degelling agent which is capable of dissolving glycerine and phthalic anhydride.

2. The process of treating a polyhydric alcohol-polybasic acid resin which consists in converting said resin by heat to the infusible, vesiculate condition, comminuting the same and heating the heat-hardened resin in contact with a neutral degelling agent which is a solvent for the alcohol and acid from which said resin is derived, until solution occurs.

3. A resinous composition comprising a polyhydric alcohol-polybasic acid resin in a fully condensed, infusible state and an appreciable quantity of indene dissolved therein.

In witness whereof, I have hereunto set my hand this 29th day of June, 1926.

LESTER V. ADAMS.